United States Patent [19]
Eby

[11] Patent Number: 5,341,627
[45] Date of Patent: Aug. 30, 1994

[54] FLY GUARD

[76] Inventor: David Eby, 52975 Diaz, La Quinta, Calif. 92253

[21] Appl. No.: 16,508

[22] Filed: Feb. 11, 1993

[51] Int. Cl.⁵ .................. B68C 5/00; A01K 13/00
[52] U.S. Cl. .................... 54/80.2; 119/861; 43/121
[58] Field of Search ............... 119/156; 54/80.2, 80.4, 54/80.5; 2/15, 441, 442, 443; 43/108, 109, 121, 132.1

[56] References Cited

U.S. PATENT DOCUMENTS

| | | | |
|---|---|---|---|
| 984,017 | 2/1911 | Moritz. | |
| 2,315,772 | 4/1943 | Closs | 43/121 X |
| 4,404,789 | 9/1983 | Denning | 54/80 |
| 4,480,429 | 11/1984 | Knox | 54/80 |
| 4,662,156 | 5/1987 | Oettel | 54/80 |
| 4,756,145 | 7/1988 | Pelling | 54/80 |
| 5,003,756 | 4/1991 | Mazzotta | 54/79 |
| 5,038,047 | 8/1991 | Still | 2/15 X |
| 5,044,114 | 9/1991 | Haberer | 43/132.1 |
| 5,155,950 | 10/1992 | Burgeson | 119/156 |

Primary Examiner—Robert P. Swiatek
Attorney, Agent, or Firm—Calif Tervo

[57] ABSTRACT

A fly guard for a horse generally comprises a flexible hood or mask with eye holes for fitting about the eyes and over adjacent parts of the head. Surrounding each eye hole is an upstanding annular collar having an outward facing surface having hook/loop fastener material thereon for releasingly attaching an eye cover to the collar and for adjusting the distance of the eye cover outer panel from the eye. The eye cover outer panel which covers the eye may be of see-through mesh or of opaque material. The hood further includes a device for holding insect repellant. The device comprises a first pair of hook/loop fastener patches including a fixed patch of outward facing hook/loop fastener material and a cover patch of mating hook/loop fastener material matingly attached to the first patch. The fastener patches retain insect repellant disposed between then. A multiplicity of such patches can be used. Different patches may be used to hold different insecticides.

11 Claims, 2 Drawing Sheets

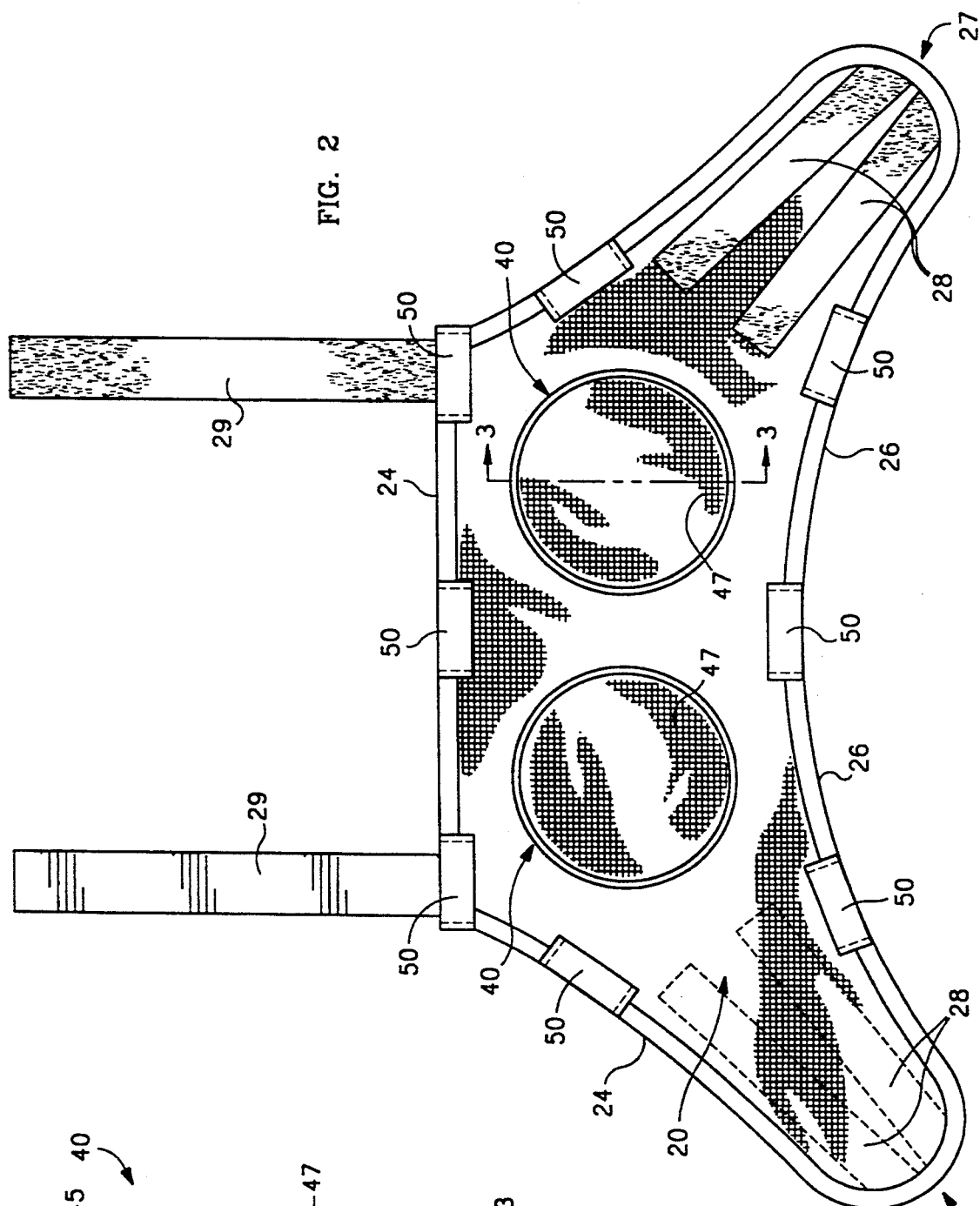
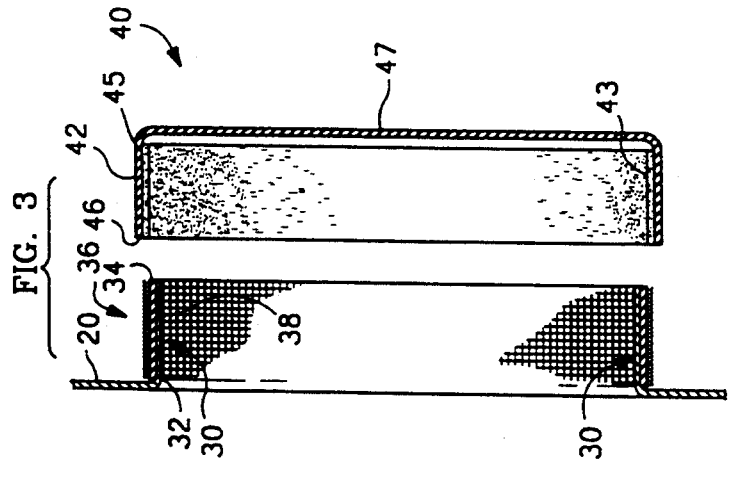
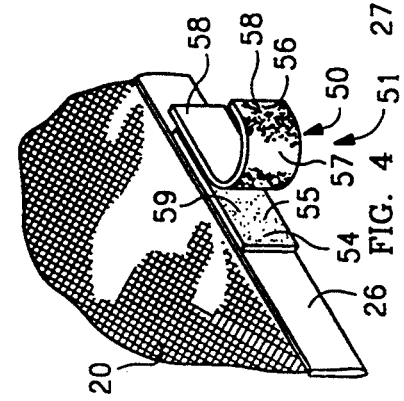

FLY GUARD

BACKGROUND OF THE INVENTION

1. Field of the Invention

The invention relates in general to a device for protecting horses from insects and more specifically includes a headdress having adjustable and removable eye covers and holders for insect repellant.

2. Prior Art

Headdresses or masks to protect a horses face and eyes are well known. U.S. Pat. No. 4,404,789 of Denning for "Animal Eye Protection Device" discloses a horse mask covering the eyes in the form of an arched mesh bubble. U.S. Pat. No. 4,480,429 of Knox for "Fly Guard" describes a mask having an cylindrical flange member surrounding the eye and topped with netting. U.S. Pat. No. 4,662,156 of Oettel for "Protective Mask for Animals" describes a mask having a formed bubble net over each eye and plush material around the exterior for preventing insects from crawling under the mask. U.S. Pat. No. 4,756,145 of Pelling for "Animal Goggles" describes a mask including eye holes having removable domed mesh.

It is desirable to have a mask that is adapted to repel insects originally, not just attempt to physically keep them off the eyes. Insect repellant creams and ointments of sufficient strength to be effective may be applied directly to the animal or to the mask. However, this is undesirable as the repellant eventually gets into areas for which it is unintended such as in the eyes or mouth of the horse or rider. Therefore, there is a need for a mask that provides a means for the safe and clean dispersal of insect repellant.

Horses eyes need considerable care. Therefore, it is desirable to have a mask that permits easy access to the eyes for care and cleaning without removing the mask.

Some horses have markedly protruding eyes or eyelashes that will strike most conventional masks. Therefore, it is desirable to have a mask with adjustable eye covers to allow for these variations.

Sometimes it is desirable that the horse not be able to see the surrounding. Therefore, it would be desirable to have a mask that is easily convertible from a see-through mask to a blinder mask.

Occasionally, it is desirable to hold medications against the eye area. Therefore, it would be additionally desirable to have a mask that provides a means for holding medications against the eye area.

Since the protruding areas of the mask over the eyes are the first to wear out, it is further desirable to have an mask in which these areas are easily replaceable.

SUMMARY OF THE INVENTION

This invention is a mask for a horse and it generally comprises a flexible mask with eye holes for fitting about the eyes and over adjacent parts of the head. The mask includes an upstanding annular collar surrounding each eye hole. Cup-shaped eye covers are removably attachable to the collars. The outward facing surface of the annular collar and the inward facing surface of the eye cover side wall have mating hook/loop fastener material thereon for releasingly attaching the eye cover to the collar such the eye cover is easily removed and such that the distance of the eye cover outer panel from the collar is adjustable. The eye cover outer panel which covers the eye may be of see-through mesh or of opaque material as desired.

In an exemplary embodiment, the hood further includes a device for holding insect repellant. The device comprises a first pair of hook/loop fastener patches including a fixed patch of outward facing hook/loop fastener material and a cover patch of mating hook/loop fastener material matingly attached to the first patch. The fastener patches retain insect repellant disposed between then. A multiplicity of such patches can be used. Different patches may be used to hold different insecticides.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 2 is a front view of the guard of FIG. 1.

FIG. 3 is a cutaway side view of the eye cover portion of the fly guard taken on line 3—3 of FIG. 2.

FIG. 4 is an enlarged perspective view of a hook/loop fastener pair with the cover patch partially peeled back.

DETAILED DESCRIPTION OF THE INVENTION

Figure 1:
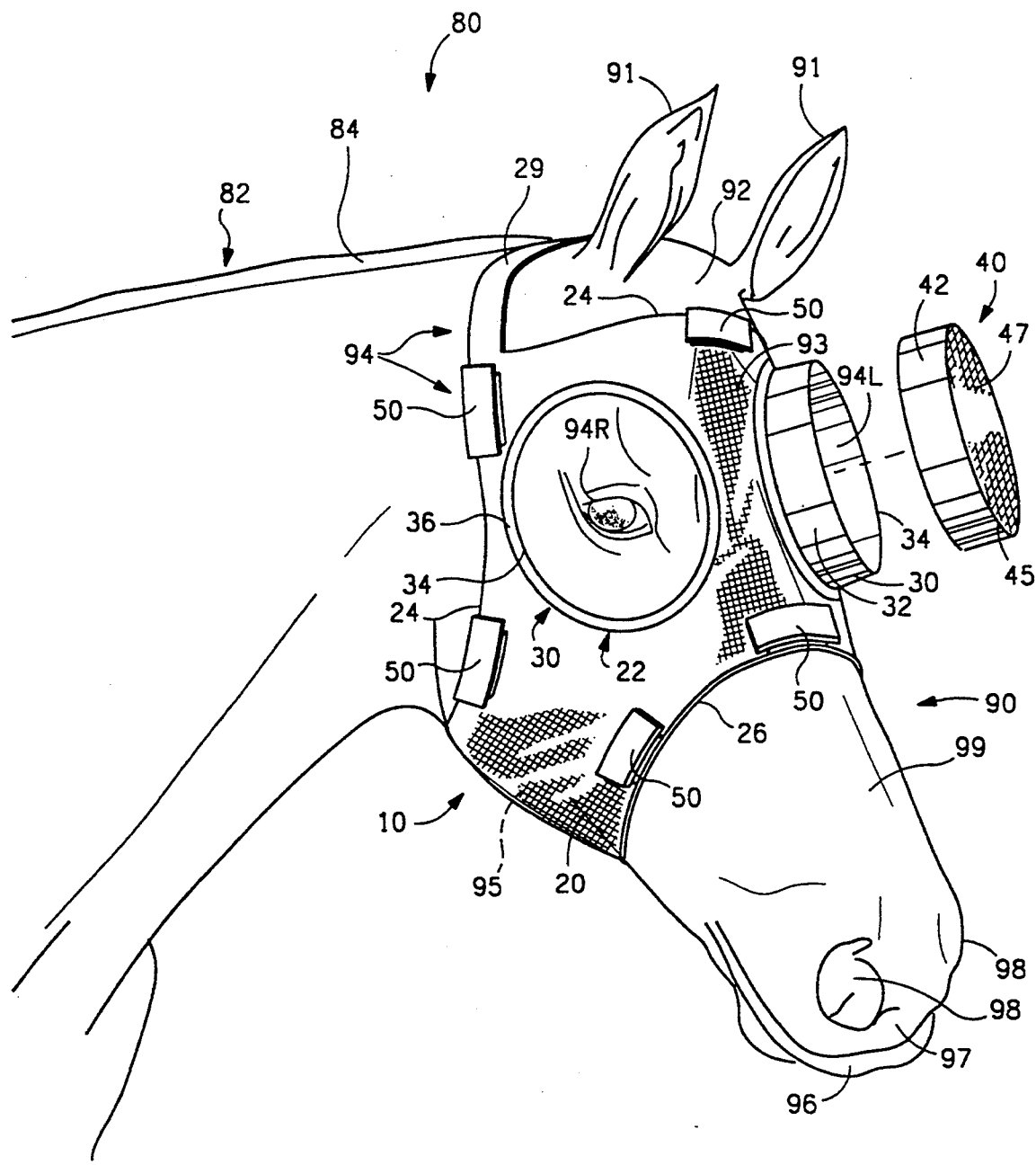
FIG. 1 is a perspective view, partially exploded, of a preferred embodiment of the fly guard of the invention as worn by a horse.

With reference now to the drawings, and more particularly to FIG. 1 thereof, there is shown a perspective view, partially exploded, of a preferred embodiment of fly guard in the form of a headdress or hood, denoted generally as 10, of the invention as worn by an animal, such as horse 80.

Horse 80 includes a neck, denoted generally as 82, including a mane 84, and a head, denoted generally as 90. Head 90 includes a pair of ears 91. Forelock 92 extends forward and downward between ears 91. A pair of eyes 94, including left eye 94L and right eye 94R, are separated by forehead 93. Head 90 further includes jaw 95, mouth 96, muzzle 97, a pair of nostrils 98, and lower face 99.

Headdress 10 generally includes a body 20 having eye holes 22 therein for fitting around eyes 94. Body 20 is flexible and is configured to contour to adjacent parts of head 90. Body 20 may be attached to head 90 by any suitable means, however, in the preferred embodiment shown, top strap 29 is attached to body 20 and passes behind ears 91 and body 20 wraps around head 90 and fastens under jaw 95.

Each eye hole 22 is surrounded by an upstanding annular collar 30 including an inner edge 32 attached to body 20. Collar 30 includes outer edge 34 and outside surface 36.

Each eye hole may be covered by a cup-shaped eye cover 40. Eye cover 40 for left eye 94L is shown removed and in position for attachment to collar 30. The eye cover for right eye 94R is not shown. Each eye cover 40 includes an annular side wall 42 for circumscribing collar 30. Cover panel 47 is attached to side wall outer edge 45 and covers eye hole 22. Cover panel 47 may be flat, as shown, or may be domed or have other configurations.

Also attached to body 20 is a plurality of insect repellant devices, such as hook/loop fastener pairs 50, which will be described in greater detail with respect to FIG. 4.

FIG. 2 is a front view of the guard 10 of FIG. 1 except guard 20 is shown in a relatively flat position and both eye covers 40 are attached. Body 20 is preferably made of strong flexible mesh material. Body 20 includes a curved upper edge 24 designed to go around a horse's head 90 in front of ears 91 and to the rear of jaw 95 at about the juncture of neck 82 and head 90. Body 20 includes a curved lower edge 26 designed to go around head 90 below eyes 94 in the area of lower face 99 above nostrils 98. As upper edge 24 and lower edge 26 approach one another, body 20 tapers to joining regions 27 that include means, such as strips 28 of mating hook/loop fastener material, for joining one region 27 to the other under jaw 95. Strips 28 provide means for adjusting the fit of body 20 on head 90.

Preferably, top strap 29 is comprised of two straps, each having one end attached to body 20 and the other end free and one having a surface covered with one type of hook/loop fastener and the other having a joining surface covered with the mating hook/loop fastener material such that the length of top strap 29 can be adjusted behind ears 91.

FIG. 3 is a cutaway side view of the eye cover portion of fly guard 10 taken on line 3—3 of FIG. 2. Collar 30, circumscribing eye opening, includes lower end 32 attached to body 20 and free outer end 34 disposed away from body 20. Inner surface 38 surrounds and defines a passage to eye 94. Outer surface 36 includes hook/loop fastener material, preferably of the hook type.

Eye cover 40 includes annular side wall 42 and cover panel 47. Side wall 42 has a free inner edge 46 and an outer edge 45. Cover panel 47 is connected to side wall outer edge 45 and completely covers the area circumscribed by side wall 42. Side wall 42 includes inner surface 43 adapted to matingly circumscribe collar 30. Inner surface 43 includes hook/loop fastening material for mating with collar outer surface 36 such that eye cover 40 is releasingly attachable to collar 30 and such that the distance of said eye cover panel 47 from body 20 and hence from eye 94 is adjustable.

In this manner, eye covers 40 are both adjustable, removable and replaceable.

It should be noted that guard 10 may have one or both eye covers 40 removed and pose no hazard to horse 80 or eyes 94. For example, eye covers 40 may be attached for riding through brush and removed for open range riding.

In the preferred embodiment, collar 30 and side wall 42 are opaque and cover panel 47 is typically see-through mesh but also may be opaque. Thus, blinders can be put on horse 80 simply by exchanging mesh eye covers with opaque eye covers.

Eye cover 40 may be detached to have access to eye 94. This feature, plus the adjustability of the distance from cover panel 47 to body 20 permits access to the eye without removal of body 20. Pads containing medicine may be held snugly to the eye by gently attaching eye cover 40 such that cover panel 46 is at the appropriate spacing. Additionally, the height adjustable feature allows for accommodation of eyes that are exceptionally protruding or have long lashes.

FIG. 4 is an enlarged perspective view of an insect repellant device 50 including a patch pair 51. A fixed patch 54 has an outward facing surface 55. A cover patch 56 has an inward facing surface 57. Cover patch 56 is releasingly attached to first patch 54 or to body 20 such that cover patch 56 is movable from a closed position wherein facing surfaces 55,57 are adjacent one another and define a holding area therebetween to an open position wherein cover patch 56 does not cover the holding area. A first insect repellant is disposed on surfaces 55,57 or in the holding area when cover patch 56 is in the closed position.

In the preferred embodiment shown, insect repellant device 50 constitutes a patch pair 51, such as a hook/loop fastener pair shown with cover patch 56 partially peeled back. Each hook/loop fastener pair 51 includes a fixed patch 54 of outward facing hook/loop fastener material, such as look fasteners 55 and a cover patch 56 of mating fastener material, such as loops 57. Cover patch 56 is designed to attach to and completely cover fixed patch 54. Cover patch includes grasping means, such as tabs 58 that extend past fixed patch 54, for grasping and peeling cover patch 56 off fixed patch 54.

Insect repellant 59 is disposed between fixed patch 54 and attached cover patch 56. In the preferred embodiment shown, insect repellant 59, such as ointment containing pyrethrin, is smeared between hooks 55 and then cover patch 56 is attached. Hooks 55 tend to trap and hold repellant 59. In this manner insect repellant 59 is completely covered and cannot be further contacted by horse 80 or other horses or by persons and cannot be spread to other objects which may be contacted. Alternately, repellant may be applied to cover patch 56.

Although, a completely separable hook-loop fastener patch pair 51 is shown in the preferred embodiment, the patch pair may be a cover flap of material attached by any means, such as sewing or snaps. It may be fixedly attached, such as by sewing along one end and releasingly attached, such as by hook/loop fastener material along the other end such that it can be swung away for application of insect repellant to the facing surfaces.

A plurality of such patch pairs 51 may be dispersed on guard 10 as necessary. Different patch pairs 51 may be used for holding different insecticides. For example, one pair 51 may hold ointment that is effective against flies for three days while another holds a spray that is effective against gnats for one day.

Although patch pair 51 is shown attached to headdress 10, it is applicable to many devices that can attach it to an object to be protected. For example, patch pair 51 may be attached to a coat or hat or collar. A collar may be comprised of concentric straps having mating hook/loop material on their facing sides and insect repellant may be disposed between the straps.

Having described the invention, it can be seen that it provides a very convenient device for protecting an animal from insects and other objects.

Although a particular embodiment of the invention has been illustrated and described, various changes may be made in the form, composition, construction, and arrangement of the parts without sacrificing any of its advantages. Therefore, it is to be understood that all matter herein is to be interpreted and illustrative and not in any limiting sense and it is intended to cover in the appended claims such modifications as come within the true spirit and scope of the invention.

I claim:

1. A headdress for a horse having a head with eyes; said headdress comprising:
    a flexible mask with eye holes for fitting about the eyes and over adjacent parts of the head; said mask including:

an upstanding annular collar surrounding each said eye hole including an outward facing surface; and a cup-shaped eye cover attached to said collar comprising:
an annular side wall circumscribing said collar; said side wall having:
an outer edge; and
an inward facing surface; and
a bottom connected to said side wall outer edge for covering said eye hole;
said outward facing surface of said annular collar and said inward facing surface of said side wall of said eye cover having mating hook/loop fastener material thereon for releasingly attaching said eye cover to said collar such that the distance of said eye cover bottom from said collar is adjustable; and means for releasingly securing said mask on the head.

2. The headdress of claim 1 wherein:
said cover bottom is made of net material through which the animal can see.

3. The headdress of claim 1 wherein:
said cover bottom is made of opaque material.

4. The headdress of claim 1 wherein:
said hook/loop fastener material on said outward facing surface of said collar is hook fastener material.

5. The headdress of claim 1 wherein:
said mask further includes:
a first pair of hook/loop fastener patches comprising:
a fixed patch of outward facing hook/loop fastener material; and
a cover patch of mating hook/loop fastener material matingly attached to said first patch; said fastener patches for retaining insect repellant disposed between said attached fixed patch and said cover patch.

6. The headdress of claim 5 further including a second pair of hook/loop fastener patches.

7. . A device for repelling insects comprising:
a first pair of hook/loop fastener patches comprising:
a first patch of material having:
an outward facing side at least partially covered by hook/loop fastener material; and
a rearward facing side; and
a second patch of material having:
an outward facing side; and
an inward facing side at least partially covered by mating hook/loop fastener material; said mating hook/loop fastener material attaching said second patch to said first patch outward facing side fastener material;
attachment means attached to said first patch for attaching said first patch to an object such that said first patch outward facing side is facing outward; and
an evaporative insect repellant disposed between said first patch and said second patch.

8. The device of claim 7 wherein:
said second patch of material includes a grasping tab.

9. The device of claim 7 wherein:
said insect repellant is disposed in said fasteners that attach said first patch to said second patch.

10. The device of claim 7 wherein:
said attachment means is a headdress.

11. A method for repelling insects from an object comprises:
obtaining a first patch of material; the first patch having a first side at least partially covered by hook/loop fastener material;
attaching the first patch of material to the object such that the first patch first side is facing outward;
obtaining a second patch of material, the second patch having a first side at least partially covered by hook/loop fastener material capable of mating with the hook/loop fastener material of the first patch first side;
applying an evaporative insect repellant to a patch first side; and
attaching the second patch first side to the first patch first side by means of the mating hook/loop fasteners such that the applied insect repellant is covered by the second patch.

* * * * *